United States Patent [19]

Arase et al.

[11] Patent Number: 5,660,927

[45] Date of Patent: Aug. 26, 1997

[54] ACICULAR METAL IRON FINE PARTICLES, PROCESS FOR PREPARING SAME, MAGNETIC COATING COMPOSITION AND MAGNETIC RECORDING MEDIUM CONTAINING SAME

[75] Inventors: Takuya Arase; Yoshiyuki Shibuya; Ikuo Kitamura; Shigeo Daimon, all of Settsu, Japan

[73] Assignee: Daikin Industries Ltd., Osaka, Japan

[21] Appl. No.: 281,657

[22] Filed: Jul. 28, 1994

Related U.S. Application Data

[63] Continuation of Ser. No. 700,274, May 15, 1991, abandoned.

[30] Foreign Application Priority Data

May 15, 1990 [JP] Japan .................... 2-126291

[51] Int. Cl.$^6$ .................................. G11B 5/66
[52] U.S. Cl. ............ 428/328; 428/329; 428/694 B; 428/694 BA; 428/694 BH; 428/695; 428/900; 427/128; 427/131; 252/62.51 R; 252/62.54; 252/62.55; 148/105; 148/122
[58] Field of Search .................... 428/328, 329, 428/900, 695, 694 B, 694 BA, 694 BM; 427/128, 131; 252/62.51, 62.54, 62.55; 148/105, 122

[56] References Cited

U.S. PATENT DOCUMENTS

| | | | |
|---|---|---|---|
| 4,075,384 | 2/1978 | Suzuki et al. | 428/212 |
| 4,506,000 | 3/1985 | Kubota et al. | 430/39 |
| 4,632,866 | 12/1986 | Kubote et al. | 428/328 |
| 4,748,080 | 5/1988 | Itozawa et al. | 428/328 |
| 4,794,042 | 12/1988 | Kubota et al. | 428/328 |

*Primary Examiner*—Leszek Kiliman
*Attorney, Agent, or Firm*—Nikaido, Marmelstein, Murray & Oram LLP

[57] ABSTRACT

The present invention provides acicular fine particles made up of iron and carbon, and these acicular metal iron fine particles can be prepared by contacting acicular iron carbide fine particles with a reducing agent containing no carbon atom. Further, the present invention provides a magnetic coating composition and magnetic recording medium containing the above acicular metal iron fine particles.

17 Claims, 2 Drawing Sheets

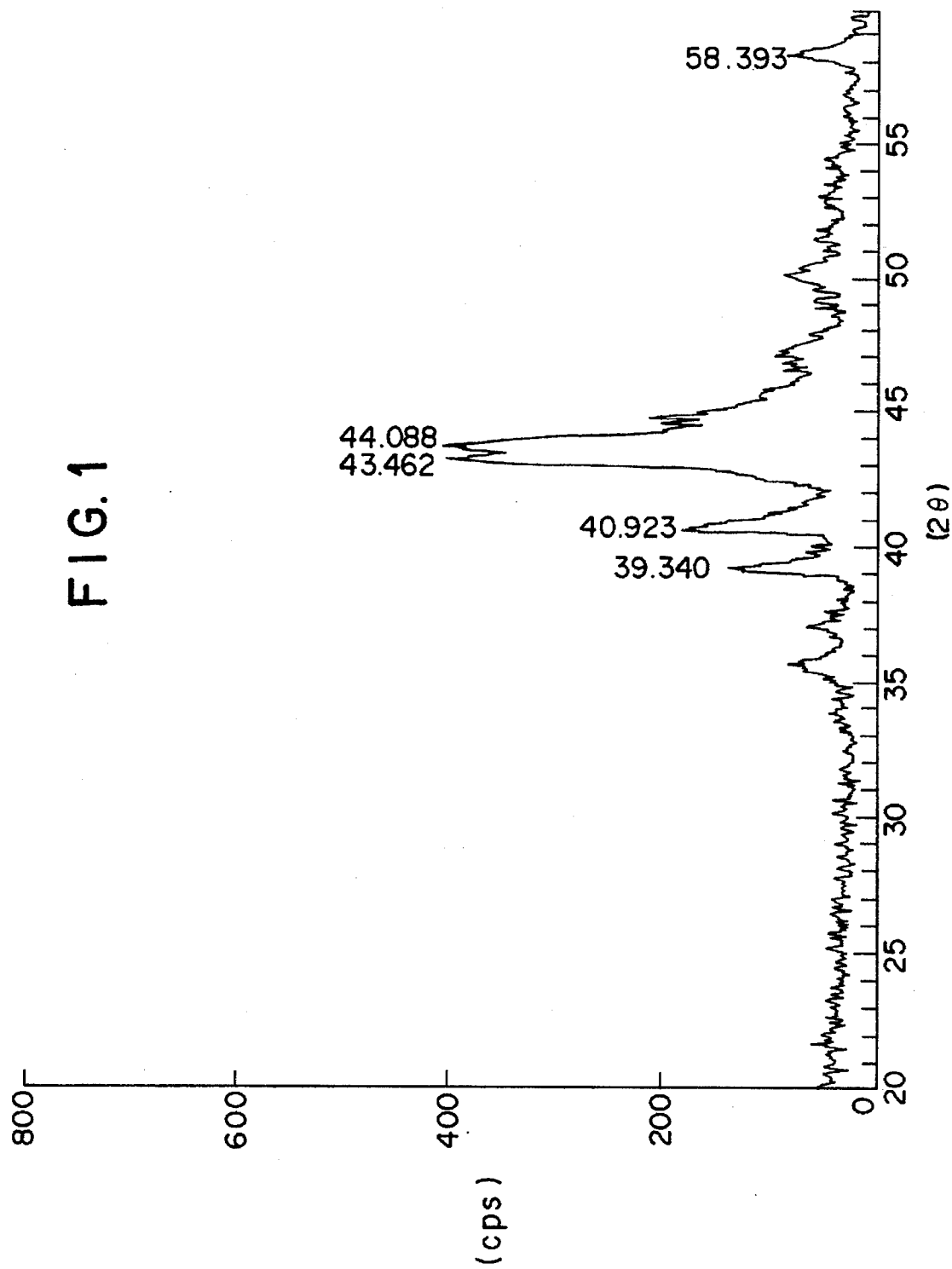

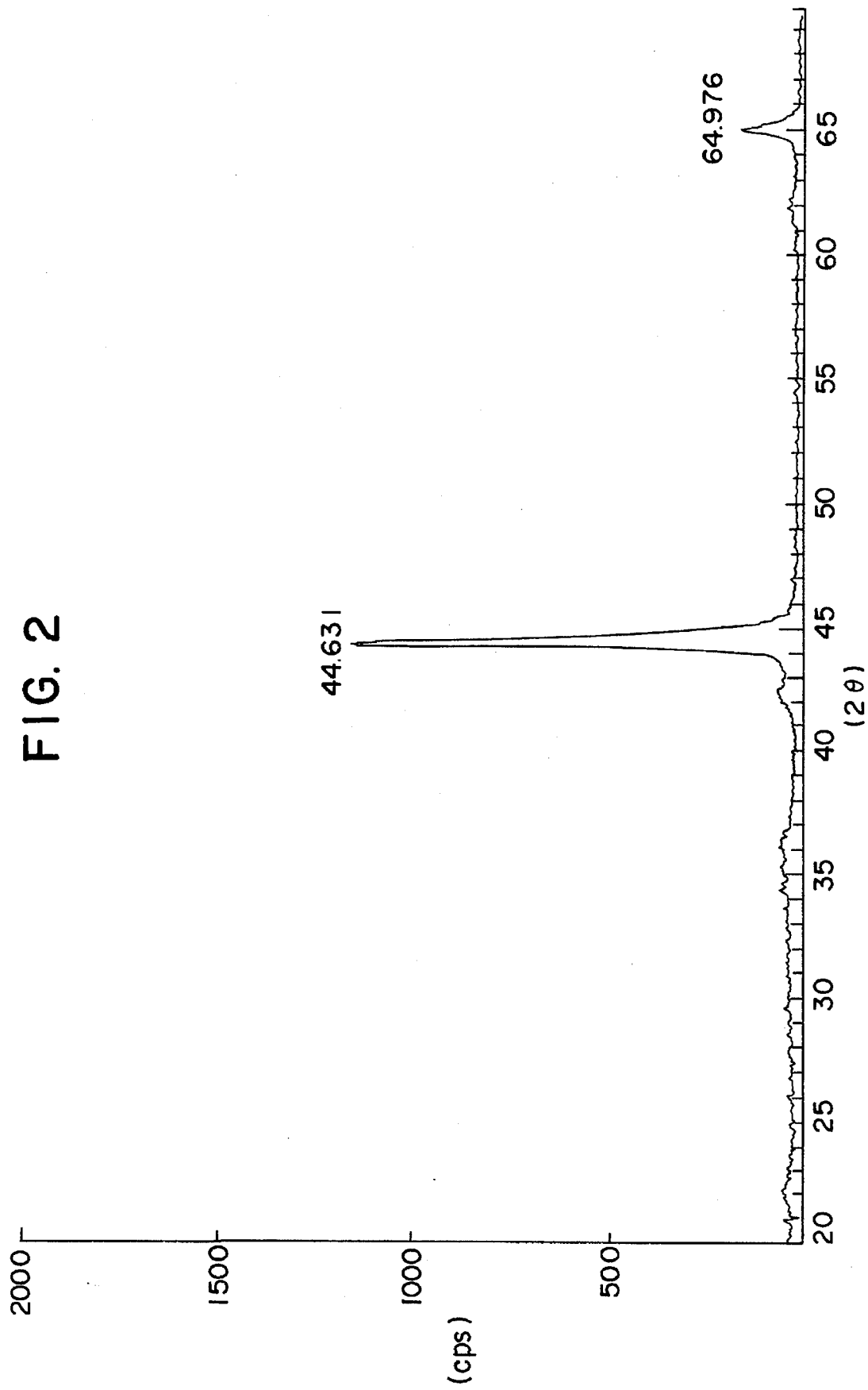

ACICULAR METAL IRON FINE PARTICLES, PROCESS FOR PREPARING SAME, MAGNETIC COATING COMPOSITION AND MAGNETIC RECORDING MEDIUM CONTAINING SAME

This application is a continuation of application Ser. No. 07/700,274 filed May 15, 1991 now abandoned.

BACKGROUND OF THE INVENTION

The present invention relates to acicular metal iron fine particles containing carbon, a process for preparing the same, magnetic coating composition and magnetic recording medium containing the same.

Conventional acicular metal iron fine particles are much superior in magnetic characteristics to acicular fine particles of iron oxide such as $\gamma$—$Fe_2O_3$, and are useful as a magnetic material for a magnetic recording medium such as a magnetic recording tape.

However, acicular metal iron fine particles have a drawback of being low in corrosion resistance because the the surfaces thereof are constituted by metal. In order to improve corrosion resistance, the surfaces of the metal iron fine particles are treated with oxygen or air to form thereon a non-magnetic or a low-magnetic oxide layer to prevent deterioration of magnetic properties with a lapse of time. However, this method sacrifices magnetization in an amount corresponding to that amount of the metallic iron which is covered with the non-magnetic oxide and usually 20 to 30% of an inherent saturation magnetization per unit weight of the metal iron are sacrificed when including the weight of a sintering-preventing agent which is added during a preparation process.

Another method of improving corrosion resistance is proposed to form a graphite film on a surface of the magnetic metal powder (JP-A-2-69904). In this method, a minute layer of graphite film is formed by the catalytic activity on the surface of the metal powder. However, saturation magnetization per unit weight is also sacrificed since the graphite is non-magnetic and a large amount of sintering-preventing agent is required to retain the metal in powder form.

Further, a magnetic metal powder which contains carbon, in the form of substantially metal carbide and is obtained from a transition metal carbonyl compound, is also proposed in JP-A-2-69903, but this method has a drawback of being expensive in its starting material. In addition, acicular particles are obtained by placing non-acicular primary particles in a magnetic field but the resulting particles generally have a large shape, which may be difficult to coat and oriented, and are unsuited for use in a magnetic recording medium.

Acicular iron carbide fine particles are known as a magnetic material which is excellent in corrosion resistance. It is known that acicular particles containing iron carbide are prepared by contacting acicular iron oxyhydroxide or acicular iron oxide with CO or a mixture of CO and $H_2$ at 250° to 400° C. and that the resulting particles are stable chemically, have a high coercive force and are useful as a magnetic material for magnetic recording medium. (For example, refer to JP-A-60-71509, 60-108309, 60-127212 and 60-155522. The term "JP-A" as used herein means an "unexamined published Japanese patent application".)

However, the acicular iron carbide fine particles are inferior in saturation magnetization per unit weight to acicular metal iron fine particles.

SUMMARY OF THE INVENTION

An object of the present invention is to provide acicular metal iron fine particles which are excellent in magnetic characteristics and in corrosion resistance, a process for preparing the same, a magnetic coating composition and a magnetic recording medium containing the same.

The above and other objects of the invention will become apparent from the following description.

The present invention provides acicular metal iron fine particles containing carbon, which have an average particle size (long axis) of up to 1.0 μm and an average axial ratio of 3 to 15, and contain carbon in an amount of 2 to 20% by weight of the acicular metal iron fine particles.

Further, the present invention provides a magnetic coating composition and a magnetic recording medium containing the above acicular metal iron fine particles.

The present acicular metal iron fine particles can be prepared by contacting acicular iron carbide fine particles with a reducing agent containing no carbon.

The present acicular metal iron fine particles are superior in corrosion resistance, and comparable or superior in coercive force and saturation magnetization to the conventional acicular metal iron particles which are obtained by reducing iron oxyhydroxide or iron oxide with hydrogen to metal or close to metal iron. Further, the present particles are excellent in dispersibility when used in a magnetic coating composition and a magnetic recording medium obtained therefrom has a much superior sheet property as compared to the conventional magnetic sheet.

It is still to be clarified why the present acicular metal iron particles containing carbon are excellent in magnetic characteristics. In a process for preparing conventional acicular metal iron fine particles, acicular iron oxide fine particles are directly reduced, and water resulting from the reduction causes sintering and deformation of particles, which render the particle inferior in coercive force and dispersibility. To obviate the above defects, a sintering-preventing agent is coated on the iron oxide in a large amount, but this causes a decrease in magnetization of the resulting metal iron fine particles per unit of weight due to the presence of the non-magnetic sintering-preventing agent. Further, when graphite or iron carbide is coated on metallic iron, carbon is liable to deposit, as a result of the catalytic activity of metal iron, which also causes a decrease of magnetization.

To the contrary, in the present invention, firstly water is not formed so much, which makes it possible to obtain metal iron having high magnetization without deteriorating the high coercive force and excellent dispersibility even when a sintering-preventing agent is used in a small amount in the reduction reaction. Further, carbon (this carbon is not graphite by analysis by X ray diffraction and is therefore presumed to be amorphous carbon) derived from the starting iron carbide protects the reduced surface of high activity. Accordingly, the present magnetic powder does not change in magnetic characteristics for a long period of time and maintains its initial high magnetic characteristics.

DETAILED DESCRIPTION OF THE INVENTION

As mentioned above in detail, the present acicular metal iron fine particles contain a sintering-preventing agent in a smaller amount than the conventional acicular metal iron fine particles. For example, when the sintering-preventing agent is a silicon(e) compound, the content thereof is up to about 3% by weight, preferably about 0.01 to 0.5% by weight based on the weight of an acicular iron oxyhydroxide. The present acicular metal iron fine particles have high coercive force more than 1000 Oe, high dispersibility and high saturation magnetization of at least 120 emu/g even when about 0.01% by weight of a sintering-preventing agent is used. Further, the active surface of the present acicular metal iron fine particles are protected by the above carbon which is present in an amount of 2 to 20% by weight of the present acicular metal iron fine particles.

In the process for preparing the present acicular metal iron fine particles, the starting acicular iron carbide fine particles are those disclosed for example in U.S. Pat. Nos. 4,842,759 and 4,668,414, etc. The iron carbide which constitutes the fine particles includes $Fe_5C_2$, $Fe_7C_3$, FeC and $Fe_3C$ and the former three iron carbides are preferable.

The above starting material, acicular iron carbide fine particles, are prepared, for example, by (a) optionally contacting acicular oxyhydroxide or acicular iron oxide with a reducing agent containing no carbon atoms and, (b) contacting the iron compound of the above (a) with a reducing agent containing carbon atom or a mixture thereof with a reducing agent containing no carbon atoms.

Examples of preferred acicular iron oxyhydroxides are acicular α —FeOOH (goethite), acicular β —FeOOH (akaganite) and acicular γ —FeOOH (lepidocrosite), and preferred acicular iron oxides are acicular α —$Fe_2O_3$ (hematite), acicular γ —$Fe_2O_3$ (maghemite) and acicular $Fe_3O_4$ (magnetite).

Acicular α —$Fe_2O_3$ or acicular γ —$Fe_2O_3$ is, for example, any of those prepared by heating acicular α —FeOOH, acicular β —FeOOH or acicular γ —FeOOH at about 200° to about 350° C., followed by dehydration, acicular α —$Fe_2O_3$ or acicular γ —$Fe_2O_3$ prepared by heating the resulting product further at about 350° to about 900° C. to compact the crystals, and others.

The above-mentioned acicular $Fe_3O_4$ can be prepared by contacting an acicular iron oxide other than acicular $Fe_3O_4$ or acicular iron oxyhydroxide with a reducing agent containing carbon atoms or a reducing agent containing no carbon atoms, or a mixture thereof. When a reducing agent containing carbon atoms or a mixture thereof with a reducing agent containing no carbon atom is contacted with an acicular iron oxyhydroxide or acicular iron oxide other than acicular $Fe_3O_4$ to prepare acicular $Fe_3O_4$, the same contact conditions as those set forth in the process decribed hereinafter can also be employed except for the time condition. In this case, the acicular $Fe_3O_4$ formed can be subsequently held in contact with the reducing gas under the same conditions as in the preceding reaction to obtain the desired acicular particulate material.

The acicular iron oxyhydroxides or acicular iron oxides can be those which usually have an average axial ratio of at least 3, preferably 5 to 15, and have an average particle size (long axis) of usually up to 1.0 μm, preferably 0.1 to 1.0 μm. As will be described later, the acicular iron carbide fine particles produced are slightly smaller than, but almost unchanged from, the starting material in average axial ratio and in average particle size.

The starting material to be used for the process for producing acicular iron carbide fine particles may have added thereto a small amount or small amounts of a compound, such as an oxide or carbonate of copper, magnesium, manganese or nickel; and/or an oxide, potassium salt or sodium salt of silicon, insofar as the starting material is acicular and chiefly comprises an iron oxyhydroxide or iron oxide.

The acicular iron oxyhydroxide preferably has a pH of at least 5 on the surface thereof as disclosed in JP-A-60-108309. In this case acicular particles are produced having a higher coercive force. An iron oxyhydroxide having a pH of less than 5 can be used after increasing its surface pH to at least 5 by contact with an aqueous solution of an alkali compound (eg, sodium hydroxide, potassium hydroxide, ammonium hydroxide). Further, alkali-treated acicular iron oxide can also be used. The starting material can be treated with an alkaline compound by contacting the material with an aqueous alkali solution of sodium hydroxide, potassium hydroxide, ammonium hydroxide (eg, with an aqueous solution having a pH of at least 8, preferably at least 10), stirring for 30 minutes to 1 hour when required, filtering and drying the mixture.

Acicular iron oxyhydroxide or iron oxide can be coated with a cobalt compound, for example, by dispersing the iron compound in an aqueous solution of a cobalt salt (eg, dilute solution of 0.1 to 10% by weight) with stirring at room temperature or with heating, render the dispersion alkaline by addition of an aqueous solution of an alkaline compound, stirring for 30 minutes to 1 hour when required, filtering and drying the dispersion.

The starting iron compound can be used coated with a sintering-preventing agent as disclosed in JP-A-60-141611. Examples of useful agents are silicon(e) compounds, boron compounds, aluminum compounds, aliphatic carboxylic acids or salts thereof, phosphorus compounds, titanium compounds, etc.

Preferable examples of silicone compounds are water glass, silane coupling agent, etc.

Examples of the silicone compounds are γ-aminopropyltriethoxysilane, N-(β-aminoethyl)-γ-aminopropyltrimethoxysilane, γ-ureidopropyltriethoxysilane, γ-glycidoxypropyltrimethoxysilane, β-(3,4-epoxycyclohexyl)-ethyltrimethylsilane, γ-methacryloyloxypropyltrimethoxy-silane, γ-mercaptopropyltrimethoxysilane, γ-chloropropyltrimethoxysilane, vinyltri(β-methoxyethoxy) silane, vinyltriethoxysilane, vinyltrichlorosilane, vinyltriacetoxysilane, etc.

Preferred examples of the boron compounds are those containing boron in the molecule in a specific form such as compounds obtained by reacting boric acid and glycerin, and like polyvalent alcohols, having adjacent hydroxyl groups. Examples of such compounds are polyoxyethylene glycerol borate laurate, polyoxyethylene glycerol borate palmitate, polyoxyethylene glycerol borate stearate, etc.

Preferable examples of aluminum compounds are potassium aluminate, sodium aluminate, etc.

Preferred examples of aliphatic carboxylic acids and salts thereof are oleic acid, coconut oil fatty acid and like aliphatic fatty acids having 12 to 20 carbon atoms; alkali metal (Na, K, etc) salts thereof; alkaline earth metal (calcium, magnesium, etc) salts thereof, ammonium salt thereof, etc.

Preferable examples of phosphorus compounds are phosphoric acid esters, phosphates, etc. Examples of the former are alkylphenol type phosphoric acid ester, alkylphosphoric acid esters (GAFAK series, a product of Toho Chemical Co., Ltd.), etc. Examples of the latter are sodium hexametaphosphate, sodium pyrophosphate, sodium metaphosphate, etc.

Preferred examples of titanium compounds are organic titanium compounds having a portion bonded to an inorganic moiety and a portion bonded to an organic moiety. Examples of such compounds are diisopropoxy bis-(acetylacetone)titanate, di-n-butoxy bis(triethanolamine) titanate, dihydroxy bis(lactic amide)titanate, tetraoctylene glycol titanate, etc.

The sintering-preventing agent can be used singly or in mixture. The amount to be coated on the surface of the starting iron compound varies depending on the kinds of the agent. When a silicone compound or an aluminum compound is used as a sintering-preventing agent, the compound is used in an amount of up to about 3% by weight and preferably about 0.01 to about 0.5% by weight based on the weight of the acicular iron oxyhydroxide. With a sintering-preventing agent of more than 3% by weight, the agent acts as a carbon-depositing catalyst in the carburizing reaction and the amount of deposited carbon, which is a non-magnetic substance, also increases. The deposited carbon lowers the magnetization and is not preferable. When the sintering-preventing agent is coated in lesser amounts, the sinter of the particles occur and render a magnetic coating composition obtained therefrom inferior in dispersibility and packing ability to a power quality magnetic sheet, The coating may be applied in the usual manner. Generally, particles of the acicular iron oxyhydroxides are dispersed in an aqueous solution of the sintering-preventing agent having a suitable concentration, the dispersion, when required, is adjusted in pH and the particles are filtered and dried.

In the processes (a) and (b) for producing acicular iron carbide fine particles which are starting compounds of the present invention, typical examples of the reducing agents containing no carbon atom are $H_2$, $NH_2NH_2$, etc.

As the reducing agent containing carbon atom in the process (b), at least one of the following compounds can be used.

① CO
② aliphatic, linear or cyclic, saturated or unsaturated hydrocarbons such as methane, propane, butane, cyclohexane, methylcyclohexane, acetylene, ethylene, propylene, butadiene, isoprene, town gas, etc.
③ aromatic hydrocarbons such as benzene, toluene, xylene, alkylated or alkenylated derivatives thereof having a boiling point up to 150° C.
④ aliphatic alcohols such as methanol, ethanol, propanol, cyclohexanol, etc.
⑤ esters such as methyl formate, ethyl acetate and like esters having a boiling point up to 150° C.
⑥ ethers such as lower alkyl ethers, vinyl ether and like ethers having a boiling point up to 150° C.
⑦ aldehydes such as formaldehyde, acetaldehyde and like aldehydes having a boiling point up to 150° C.
⑧ ketones such as acetone, methyl ethyl ketone, methyl isobutyl ketone and like ketones having a boiling point up to 150° C.

Particularly preferable reducing agents containing carbon atom are CO $CH_3OH$ $HCOOCH_3$, and/or saturated or unsaturated aliphatic hydrocarbons having 1 to 5 carbon atoms.

In the process (a) above, the reducing agent containing no carbon atom can be used as it is or it can be diluted. Examples of diluents are $N_2$, argon, helium, etc. The dilution ratio is suitably selected but is preferably about 1.1 to about 10 times (by volume). The contact temperature, contact time, gas flow rate and other conditions depend, for example, on the production history, average axial ratio, average particle size and specific surface area of the acicular iron oxyhydroxide or acicular iron oxide. The preferred contact temperature is about 200° to about 700° C., preferably about 300° to about 400° C. The preferred contact time is about 0.5 to about 6 hours. The preferred gas flow rate (excluding diluent) is about 1 to about 1000 ml S.T.P./min, more preferably about 5 to about 500 ml S.T.P./min, per gram of the starting material. The contact pressure is not limited but, inclusive of the diluent, is usually 1 to 2 atm.

In the process (b) of the above, a reducing agent containing carbon atom or a mixture thereof with a reducing agent containing no carbon atom can be used as it is or as diluted. When the mixture is used, the mixing ratio of the reducing agent containing carbon atom and the reducing agent containing no carbon atom is suitably selected but is preferably 1/0.05 to 1/5 by volume. Contact conditions are also suitably selected but the preferred contact temperature is about 250° to about 400° C., more preferably about 300° to about 400° C. The preferred contact time is about 0.5 to 6 hours when the contact in (a) is conducted, and about 1 to about 12 hours when the contact in (a) is not conducted. The preferred gas flow rate (excluding diluent) is about 1 to about 1000 ml S.T.P./min, more preferably about 5 to about 500 ml S.T.P./ml, per gram of the starting iron compound. The contact pressure is not limited but, inclusive of that of the diluent, is usually 1 to 2 atm.

The product obtained from the above process is an iron carbide which may contain a small amount of deposited carbon and iron oxide. The iron carbide obtained above contains $Fe_5C_2$ as a main component but may contain $Fe_7C_3$, FeC and $Fe_3C$.

In the present invention, the desired acicular metal iron fine particles containing carbon can be prepared by contacting acicular iron carbide fine particles with a reducing agent containing no carbon atom. Examples of the reducing agent containing no carbon atom are $H_2$, $NH_2NH_2$, etc., as mentioned above. The Preferred contact temperature is about 300° to about 500° C. and the preferred contact time is about 0.5 to about 6 hours. The same diluent as above can be used as required. The preferred gas flow rate (excluding diluent) is about 1 to about 1000 ml S.T.P./min, per gram of the acicular iron carbide fine particles. The contact pressure is not limited but, inclusive of that of the diluent, is usually 1 to 2 atm.

The present acicular metal iron fine particles containing carbon obtained above contain carbon in an amount of usually 2 to 20% by weight, preferably 5 to 15% by weight based on the acicular metal iron fine particles. When this carbon content is exceeded, the magnetization is not improved as much and when the carbon content is lower, the corrosion resistance is low. The carbon content is represented by the total amount of carbon which is the sum of the carbon in the starting iron carbide and the deposited carbon. The carbon which exists in a preferred amount in the present invention has been confirmed by elementary analysis and has not been detected by X ray diffraction as either iron carbide or graphite. The morphology of the carbon is presumed to be amorphous but this is not clear in detail. The acicular metal iron fine particles of the present invention have an average axial ratio of 3 to 15 and are usually up to 1.0 μm, preferably 0.1 to 1.0 μm in average particle size (long axis).

The magnetic coating composition can be prepared by dispersing the above acicular metal iron fine particles of the present invention in an organic solvent together with a binder. To the composition are added, as required, a dispersing agent, lubricant, abrasive, antistatic agent and like additives.

Hitherto known thermoplastic resins, thermosetting resins, reaction-type resins, or mixtures thereof, can be used as binders.

Suitable thermoplastic resins are those which have a softening point of about 150° C. or less, an average molecular weight of about 10,000 to 200,000, and a degree of polymerization of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins and mixtures thereof.

Suitable thermosetting resins or reaction-type resins have a molecular weight of about 200,000 or less as a coating solution, and when heated after coating and drying, the molecular weight becomes infinite due to reactions such as condensation, addition, and the like. Of these resins, preferred resins are those which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and a diisocyanate-prepolymer, a mixture of a polyester-polyol and a polyisocyanate, a urea-formaldehyde resin, a mixture of a low molecular weight glycol, a high molecular weight diol and triphenylmethane triisocyanate, a polyamine resin, and mixtures thereof, etc.

These binders can be used singly or in mixture, and additives can be added to the binders. The binders are used in an amount of preferably 10 to 400 parts by weight, more preferably 30 to 200 parts by weight per 100 parts by weight of the acicular particles.

The organic solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; and the like.

The dispersing agents used include aliphatic acids having 12 to 18 carbon atoms ($R^1COOH$ wherein $R^1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, graphite, molybdenum disulfide, tungsten disulfide, aliphaticesters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (a total of the carbon atoms of the monobasic aliphatic acid and the carbon atoms of the monohydric alcohol are 21 to 23), etc. These lubricants are added in an amount of 0.2 to 20 parts by weight per 100 parts by weight of the binder.

The abrasives used include those which are generally used, such as fused alumina, silicon carbide, chromium oxide, corundum, artificial corundum, diamond, artificial diamond, garnet and emery (main components: corundum and magnetite). The average particle diameter of these abrasives is 0.05 to 5 μm, preferably 0.1 to 2 μm. These abrasives are added in an amount of 7 to 20 parts by weight per 100 parts by weight of the binder.

Examples of the antistatic agents are natural surfactants such as saponin, nonionic surfactants such as alkylene oxide-base, glycerin-base or glycidol-base surfactant; cationic surfactants such as higher alkylamines, quaternary ammonium salts, pyridine and like heterocyclic compounds, phosphonium or sulfonium compounds; anionic surfactants such as those containing a carboxylic acid, sulfonic acid, phosphoric acid, sulfate group or phosphate group and like acid group; ampholytic surfactants such as amino acids, amino sulfonic acid, sulfate or phosphate of aminoalcohol, etc. These antistatic agent can be used singly or in mixture. Although the above compounds are used as antistatic agents, the compounds can be used in some cases, to improve the dispersibility, magnetic characteristics, lubricability or coating ability. These antistatic agents are added in an amount of 1 to 2 parts by weight per 100 parts by weight of the binder.

The magnetic recording medium of the present invention is obtained by coating the above magnetic coating composition on a substrate (support).

The thickness of the support is about 5 to 50 μm, preferably about 10 to 40 μm. The materials used for the support include polyesters such as polyethylene terephthalate and polyethtylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer.

The supports may be in any shape such as a tape, sheet, card, disc or drum, and various materials can be used depending upon the shape desired and end use contemplated.

The magnetic coating composition can be applied on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used.

The magnetic layer formed on the support by the above method is dried after, if desired, the coating has been subjected to a treatment for orienting the magnetic powder in the layer. If required, the magnetic layer can be subjected to a surface smoothening treatment, or cut to the desired shape, to thereby form the magnetic recording material of this invention. In the above orienting treatment for the magnetic layer, the orienting magnetic field can be either an AC or DC magnetic field with a field strength of about 500 to 5,000 gauss. The drying temperature can range from about 50° to about 100° C., and the drying time is about 3 to 10 minutes.

The invention is described below in detail by showing examples and comparison examples.

BRIEF DESCRIPTION OF THE DRAWINGS

FIG. 1 is a X ray diffraction pattern of acicular iron carbide fine particles obtained in Example 3.

FIG. 2 is a X ray diffraction pattern of acicular metal iron fine particles of the present invention obtained in Example 3.

EXAMPLES OF THE INVENTION

In the following examples, characteristic, properies, etc. are determined in the methods described below.

(1) Magnetic properties

Determined in the following method in Examples 1 and 2 and Comparison Examples 1 to 3.

Coercive force (Hc, Oe), saturation magnetization ($\sigma$ s, e.m.u./g) and square ratio (Sq) are measured in a magnetic field with a strength of 5 kOe, using a gauss meter equipped with a Hall-effect element and the sample with a packing ratio of 0.2. In Examples 3 to 6 and Comparison Example 4, the magnetic properties are measured in a magnetic field with a strength of 10 kOe (powder) and 5 kOe (sheet), using a magnetic property measuring device of sample-vibrating type in stead of the gauss meter.

(2) Elementary analysis for C, H and N

The sample is subjected to elementary analysis in the conventional method using MT2 CHN CORDER Yanaco, product of Yanagimoto Mfg. Co., Ltd, with passage of oxygen (helium carrier) at 900° C.

(3) Specific surface area

BET specific surface area is measured by nitrogen adsorption method.

(4) Corrosion resitance (Resistance to oxidation)

(1−B/A)×100 (%)

A: saturation magnetization $\sigma$ s (emu/g)

B: $\sigma$ s after allowed to place in air at 100° C. for 8 hours

EXAMPLE 1

In 194 l of water was dispersed 6 kg of acicular goethite particles, 0.7 μm in average particle size (long axis) and 10 in average axial ratio. After adding a small amount of an amount of an alkaline solution (20% NaOH solution) to adjust pH more than 13, 1 kg of water glass No. 3 ($Na_2O \cdot 3SiO_2$) [about 2.6% of Si by weight of $\alpha$—FeOOH] was added to the solution with stirring. To the aqueous solution was added 1N—HCl to adjust pH 5. After one hour, the dispersion was filtered and dried. The obtained powder was placed into a muffle furnace and heated at 600° C. for 1 hour to prepare an $\alpha$—$Fe_2O_3$ powder.

A 3 kg quantity of the a $\alpha$—$Fe_2O_3$ powder was charged into a reaction tube. The powder was treated at 365° C. for 8 hours while passing CO through the tube at a flow rate of 90 l/min., then the CO gas was replaced by nitrogen. After cooling to room temperature, nitrogen was gradually changed to air and the iron carbide powder was obtained.

The X-ray (Cu K$\alpha$ ray) diffraction pattern of the product corresponds to that of $Fe_5C_2$ Iron Carbide on ASTM X-Ray Powder Data File 20-509. A 40 g quantity of the obtained powder was charged into a reaction tube. The powder was treated at 320° C. for 3 hours while passing $H_2$ through the tube at a flow rate of 5 l/min., then the $H_2$ gas was replaced by nitrogen. After cooling to room temperature, nitrogen was gradually changed to air and the powder of the present invention was obtained. The X-ray diffraction pattern of the product corresponds to that of $\alpha$—Fe on ASTM X-Ray Powder Data File 6-696. The powder was confirmed to maintain a good acicular shape by a transmission electron microscope. When examined for magnetic properties, the powder of the present invention was 1240 Oe in Hc and 146 emu/g in $\sigma$ s. The powder was 12% in total carbon content and 54 $m^2/g$ in BET specific surface area by nitrogen adsorption method. The powder decreased 13% in $\sigma$ s when corrosion resistance thereof is examined. In 60 g of a solvent were mixed and dispersed 20 g of the powder and 5 g of a modified polyurethane resin to prepare a magnetic coating composition. The composition was applied to a polyethylene terephthalate (PET) film in about 5 μ thickness to obtain a magnetic sheet. The sheet was 1280 Oe in Hc, 2400 G in saturation flux density and 0.76 in square ratio.

EXAMPLE 2

A 40 g of quantity of $\alpha$—$Fe_2O_3$ powder obtained in Example 1 was charged into a reaction tube. The powder was treated at 365° C. for 3.5 hours while passing CO through the tube at a flow rate of 5 l/min., then the CO gas was changed to hydrogen and the powder was further treated for 1 hour. The hydrogen was replaced by nytrogen. After cooling to room temperature, nitrogen was gradually changed to air and the powder was obtained. Table 1 shows the results.

EXAMPLE 3

In 20 l of water was dispersed 1 kg of acicular goethite particles, 0.4 μm in average particle size (long axis) and 10 in average axial ratio. After adding a small amount of an alkaline solution (20% NaOH solution) to adjust pH more than 13, 0.02 kg [about 0.27% of Si by weight of $\alpha$—FeOOH] of water glass No. 3 was added to the solution with stirring. The aqueous solution was adjusted to pH 5. After one hour, the dispersion was filtered and dried.

The obtained powder was placed into a muffle furnace and heated at 600° C. for 1 hour to prepare an $\alpha$—$Fe_2O_3$ powder.

A 0.5 kg quantity of the a $\alpha$—$Fe_2O_3$ powder was charged into a reaction tube. The powder was treated at 365° C. for 5 hours while passing CO through the tube at a flow rate of 90 l/min., then the CO gas was replaced by nitrogen. After cooling to room temperature, nitrogen was gradually changed to air and the iron carbide powder was obtained.

The X-ray diffraction pattern of the product shown in FIG. 1 corresponds to that of $Fe_5C_2$ Iron Carbide on ASTM X-Ray Powder Data File 20-509. A 40 g quantity of the obtained powder was charged into a reaction tube. The powder was treated at 320° C. for 2 hours while passing $H_2$ through the tube at a flow rate of 5 l/min., then the $H_2$ gas was replaced by nitrogen. After cooling to room temperature, nitrogen was gradually changed to air and the powder of the present invention was obtained. The X-ray diffraction pattern of the product shown in FIG. 2 corresponds to that of $\alpha$—Fe on ASTM X-Ray Powder Data File 6-696. Neither diffraction peak of graphite nor iron carbide was observed. The powder was confirmed to maintain a good acicular shape by a transmission electron microscope. When examined for magnetic properties, the powder of the present invention was 1540 Oe in Hc and 158 emu/g in $\sigma$ s. The powder was 10% in total carbon content and 56 $m^2/g$ in BET specific surface area by nitrogen adsorption method. The powder decreased 15% in $\sigma$ s when corrosion resistance thereof is examined. In 60 g of a solvent were mixed and dispersed 20 g of the powder and 5 g of polyvinyl chloride resin containing sulfonyl group (MR-110, Nihon Zeon Co., Ltd.) to prepare a magnetic coating composition. The composition was applied to a polyethylene terephthalate (PET) film in about 5 μ thickness to obtain a magnetic sheet. The sheet was 1520 Oe in Hc, 4950 G in saturation flux density and 0.86 in square ratio. When the sheet was allowed to place at 60° C. and 90% RH for one week, the saturation magnetization lowered about 7%. A sheet obtained with use of the conventional acicular metal iron fine particles showed decrease in the saturation magnetization of 10 to 13.

EXAMPLE 4

The treatment and reaction were conducted in the same manner as in Example 3 with the exception of using goethite particles having a different shape, 0.25 μm in average particle size (long axis) and 6 in average axial ratio. The results were given in Table 2.

EXAMPLE 5

The treatment and reaction were conducted in the same manner as in Example 3 with the exception of using 0.01 kg of sodium aluminate ($NaAlO_2$, 75% purity) as a surface-treating agent. The results were given in Table 2.

EXAMPLE 6

In 20 l of water was dispersed 1 kg of acicular goethite particles, 0.4 μm in average particle size (long axis) and 10 in average axial ratio. After adding a small amount of an alkaline solution (20% NaOH solution) to adjust pH more than 13, 0.02 kg of water glass No. 3 and 0.01 kg of sodium aluminate were added to the solution. The aqueous solution was adjusted to pH 5. After one hour, the dispersion was filtered and dried.

The obtained powder was placed into a muffle furnace and heated at 600° C. for 1 hour to prepare an α—$Fe_2O_3$ powder.

A 0.5 kg quantity of the α—$Fe_2O_3$ powder was charged into a reaction tube. The powder was treated at 370° C. for 5 hours while passing CO through the tube at a flow rate of 90 l/min., then the CO gas was replaced by nitrogen. After cooling to room temperature, nitrogen was gradually changed to air and the iron carbide powder was obtained.

A 40 g quantity of the obtained iron carbide powder was charged into a reaction tube. The powder was treated at 400° C. for 1 hours while passing $H_2$ through the tube at a flow rate of 5 l/min., then the $H_2$ gas was replaced by nitrogen. After cooling to room temperature, nitrogen was gradually changed to air and the powder of the present invention was obtained. The results were shown in Table 2.

COMPARISON EXAMPLE 1

For comparison, a magnetic powder which corresponds to $Fe_5C_2$ obtained in Example 1 was evaluated in the same manner as above without subjected to reduction. The results are shown in Table 1.

COMPARISON EXAMPLE 2

Metal iron fine particles were prepared by reacting α—$Fe_2O_3$ obtained in Example 1 with only $H_2$ at conditions shown in the Table followed by gradual oxidation and the resulting powder was evaluated in the same manner as above. The results are shown in Table 1. It is apparent from Table 1 that the specific Surface area is small. The transmission electron microscope reveals the sintering occurs between particles to render the magnetic coating composition inferior in dispersibility due to the sinter between acicular particles. The sheet obtained therefrom is low in square ratio and corrosion resistance. Although a-coating agent (Si) is added in α—$Fe_2O_3$ obtained in Example 1, the results of Comparison Example 2 show the amount of the agent was insufficient.

COMPARISON EXAMPLE 3

A magnetic powder having coated iron carbide thereon was obtained by reducing α—$Fe_2O_3$ obtained in Example 1 with firstly $H_2$ to prepare metal iron and subsequently treated with a mixture of CO:$N_2$ (5:95) and the resulting powder was evaluated in the same manner as above. The obtained iron carbide was $Fe_3C$. The results are shown in Table 1. It is apparent from Table 1 that all of the coercive force, magnetization, specific surface area, corrosion resistance and square ratio are lower than the metal iron fine particles of the present invention.

COMPARISON EXAMPLE 4

A 40 g quantity of the iron carbide powder, an intermediate, obtained in Example 3 was charged into a reaction tube. The powder was treated at 320° C. for 20 minutes while passing $H_2$ through the tube at a flow rate of 5 l/min. The X-ray diffraction pattern reveals the product was a mixture of $Fe_5C_2$ and α—Fe which shows the second step reaction was incomplete. Table 2 shows all of the properties are low and improvement in the magnetic properties are small when iron carbide remains.

TABLE 1

|  | Example | | Comparison Example | | |
|---|---|---|---|---|---|
|  | 1 | 2 | 1 | 2 | 3 |
| first step reaction | | | | | |
| gas | CO | CO | CO | $H_2$ | $H_2$ |
| temperature (°C.) | 365 | 365 | 365 | 365 | 365 |
| time (hr) | 8 | 3.5 | 3.5 | 6 | 6 |
| product in the first step reaction | $Fe_5C_2$ | $Fe_5C_2$ | $Fe_5C_2$ | α-Fe | α-Fe |
| second step reaction | | | | | |
| gas | $H_2$ | $H_2$ | | | CO/$N_2$ = 5/95 |
| temperature (°C.) | 320 | 365 | | | 365 |
| time (hr) | 3 | 1 | | | 1 |
| product | α-Fe | α-Fe | $Fe_5C_2$ | α-Fe | $Fe_3C$ |
| powder characteristics | | | | | |
| Hc (Oe) | 1240 | 1250 | 950 | 1150 | 780 |
| saturation magnetization (emu/g) | 146 | 145 | 89 | 139 | 91 |
| total carbon content (%) | 12 | 8 | 15 | 0 | 7 |
| specific surface area (m²/g) | 54 | 50 | 45 | 28 | 29 |
| corrosion resistance (%) | 13 | 14 | 12 | 20 | 50 |
| sheet characteristics | | | | | |
| Hc (Oe) | 1280 | 1240 | 940 | 1110 | 750 |
| saturation flux density (G) | 2400 | 2600 | 1500 | 2700 | 1800 |
| square ratio | 0.76 | 0.76 | 0.75 | 0.74 | 0.67 |

TABLE 2

|  | Example | | | | Com. Ex |
|---|---|---|---|---|---|
|  | 3 | 4 | 5 | 6 | 4 |
| first step reaction | | | | | |
| gas | CO | CO | CO | CO | CO |
| temperature (°C.) | 365 | 365 | 365 | 370 | 365 |
| time (hr) | 5 | 5 | 5 | 5 | 5 |
| product in the first step reaction | $Fe_5C_2$ | $Fe_5C_2$ | $Fe_5C_2$ | $Fe_5C_2$ | $Fe_5C_2$ |
| second step reaction | | | | | |
| gas | $H_2$ | $H_2$ | $H_2$ | $H_2$ | $H_2$ |
| temperature (°C.) | 320 | 320 | 320 | 400 | 320 |
| time (hr) | 2 | 2 | 2 | 1 | 0.33 |
| product | α-Fe | α-Fe | α-Fe | α-Fe | α-Fe/$Fe_5C_2$ |

TABLE 2-continued

| | Example | | | | Com. Ex |
|---|---|---|---|---|---|
| | 3 | 4 | 5 | 6 | 4 |
| powder characteristics | | | | | |
| Hc (Oe) | 1540 | 1650 | 1530 | 1610 | 990 |
| saturation magnetization (emu/g) | 158 | 155 | 166 | 150 | 105 |
| total carbon content (%) | 10 | 11 | 10 | 12 | 14 |
| specific surface area (m²/g) | 56 | 59 | 56 | 55 | 51 |
| corrosion resistance (%) | 15 | 16 | 15 | 13 | 14 |
| sheet characteristics | | | | | |
| Hc (Oe) | 1520 | 1610 | 1520 | 1600 | 990 |
| saturation flux density (G) | 4950 | 4890 | 5080 | 4800 | 3370 |
| square ratio | 0.86 | 0.87 | 0.87 | 0.89 | 0.70 |

The present acicular metal iron fine particles are excellent both in magnetic properties and corrosion resistance. The present particles are for example at least 1000 Oe in coercive force and at least 120 emu/g in saturation magnetization, which are superior to those of the conventional acicular metal iron fine particles. The present particles are almost comparable to acicular iron carbide fine particles, and are much superior to the conventional acicular metal iron fine particles, in corrosion resistance. Further, the present particles are excellent in dispersibility when used in a magnetic coating composition and a magnetic recording medium obtained therefrom has excellent saturation flux density and stable magnetic properties for a long period of time.

We claim:

1. Magnetic coating composition comprising a magnetic material comprising acicular magnetic particles, which have an average long axis particle size of up to 1.0 μm and an average axial ratio of 3:1 to 15:1, comprising metallic iron and carbon in an amount of 2 to 20% by weight of said fine particle and containing substantially no iron carbide.

2. A magnetic recording medium comprising: a substrate, and disposed thereon a magnetic material comprising acicular magnetic particles, which have an average long axis particle size of up to 1.0 μm and an average axial ratio of 3:1 to 15:1, comprising metallic iron and carbon in an amount of 2 to 20% by weight of said fine particle and containing substantially no iron carbide.

3. A magnetic coating composition as claimed in claim 1 additionally comprising a binder binding said magnetic fine particles into a cohesive coating.

4. A magnetic recording medium as claimed in claim 2 wherein said acicular-fine particles are joined together into a cohesive layer by a binder.

5. Magnetic acicular particles comprising metallic iron and free carbon and containing substantially no iron carbide; having an average particle size with a long axis of up to 1.0 μm and an average axial ratio of 3:1 to 15:, wherein said carbon is present in an amount of 2 to 20% by weight of said fine particles.

6. Acicular metal iron fine particles containing carbon as defined in claim 5 which have an average long axis particle size of up to 1.0 μm and an average axial ratio of 3:1 to 15:1 and contain carbon in an amount of 2 to 20% by weight of said fine particles.

7. Acicular particles as claimed in claim 5 wherein said carbon is substantially amorphous.

8. Acicular particles as claimed in claim 5 wherein said carbon is substantially non-graphitic.

9. Acicular particles as claimed in claim 5 which are magnetic.

10. Acicular magnetic particles as claimed in claim 9 having a coercive force of more than 1,000 Oe and a saturation magnetism of at least 120 emu/g.

11. A magnetic coating composition comprising acicular fine particles as claimed in claim 1.

12. A magnetic coating comprising acicular particles as claimed in claim 7.

13. A magnetic coating comprising acicular particles as claimed in claim 8.

14. A magnetic coating comprising acicular magnetic particles as claimed in claim 10.

15. Acicular fine particles as claimed in claim 5 comprising metallic iron and free carbon disposed on said iron.

16. Acicular fine particles as claimed in claim 5 made from a composition comprising at least one member of the group consisting of iron oxide and iron oxyhydroxide, and, in addition, a sintering preventing agent.

17. Magnetic acicular particles as claimed in claim 5 made by the process of contacting magnetic iron oxide with a first reducing agent containing carbon, under conditions sufficient to convert iron oxide to iron carbide, to produce an intermediate product comprising magnetic iron carbide; and contacting said intermediate product with a second reducing agent, which contains no carbon, under conditions, including substantially no carbon contributing compound, sufficient to reduce iron carbide to metallic iron, to produce a final magnetic product comprising metallic iron and free carbon as determined by X-ray diffraction pattern, and substantially no iron carbide.

* * * * *